April 24, 1973  C. A. HELLER ET AL  3,729,425
POROUS CHEMILUMINESCENT MATERIAL AND METHOD OF MANUFACTURE
Filed April 29, 1969  2 Sheets-Sheet 1

INVENTORS.
CARL A. HELLER
HERBERT P. RICHTER
WILLIAM S. MC EWAN
BY
ROY MILLER
ATTORNEY.

United States Patent Office 3,729,425
Patented Apr. 24, 1973

---

3,729,425
POROUS CHEMILUMINESCENT MATERIAL AND METHOD OF MANUFACTURE
Carl A. Heller, Herbert P. Richter, and William S. McEwan, China Lake, Calif., assignors to the United States of America as represented by the Secretary of the Navy
Filed Apr. 29, 1969, Ser. No. 823,244
Int. Cl. C09k 3/00
U.S. Cl. 252—188.3 CL          3 Claims

ABSTRACT OF THE DISCLOSURE

A porous sponge-like chemiluminescent material comprising porous polyethylene impregnated with tetrakis-(dimethylamino)ethylene and having lithium chloride dispersed throughout the walls of the pores. This material is used in location markers, free-fall dispensers, and the like, and gives good light yield under humid conditions.

GOVERNMENT INTEREST

The invention described herein may be manufactured and used by or for the Government of the United States of America for governmental purposes without the payment of any royalties thereon or therefor.

BACKGROUND OF THE INVENTION

The invention relates to a porous chemiluminescent material capable of improved light emission; more particularly, a chemiluminescent sponge comprising porous polyethylene saturated with tetrakis(dimethylamino)ethylene (TMAE) and lithium chloride dispersed throughout the walls of the pores.

Certain tetrakis(disubstituted-amino)ethylene compositions are known to luminesce when exposed to oxygen. Tetrakis(dimethylamino)ethylene has strong election donor properties and oxidizes vigorously in air with chemiluminescence. Kinetic studies have shown that the light producing reaction is complex and requires catalysis by protonic materials. The main oxidation products, tetramethylurea (TMU) and tetramethyloxamide (TMOA) act as quenchers for the light emission. The literature reports the following yield oxidation products of neat tetrakis-(dimethylamino)ethylene:formaldehyde, 0–4%; dimethylamine, 0–2%; tetramethylhydrazine; 5–10%; bis(dimethylamino)methane, 2–5%; tetramethylurea, 65–80%; and tetramethyloxamide, 15–20%. It is disclosed in copending patent application Ser. No. 803,526, filed Feb. 26, 1969, that a formulation containing powdered polyethylene, tetrakis(dimethylamino)ethylene and a powdered lithium halide gives superior light output apparently due to the lithium halide forming a complex with the tetramethylurea by-product thereby suppressing the light quenching effect caused by the excess tetramethylurea (TMU). The present invention is an improvement over said co-pending application. The powdered chemiluminescent formulation disclosed therein is operable when contained at a depth of approximately one centimeter. The powdered formulation is poorly effective alone, showing no beneficial effect of lithium chloride when spread thinly on a surface. The present new porous chemiluminescent material permits control of the duration or intensity of light by physical methods, and the material is effective in the field providing superior light output under various environmental circumstances including high humidity conditions.

It is the general purpose of this invention to provide a chemiluminescent material for use in nocturnal markers and signals over large areas which produce uniform light emission under varied climatic conditions when exposed to air. The material is particularly useful as a free-fall marker, and in large location markers to provide emergency light sources to aid rescue operations on land or water under very humid conditions.

DESCRIPTION OF THE INVENTION

Figure 1:
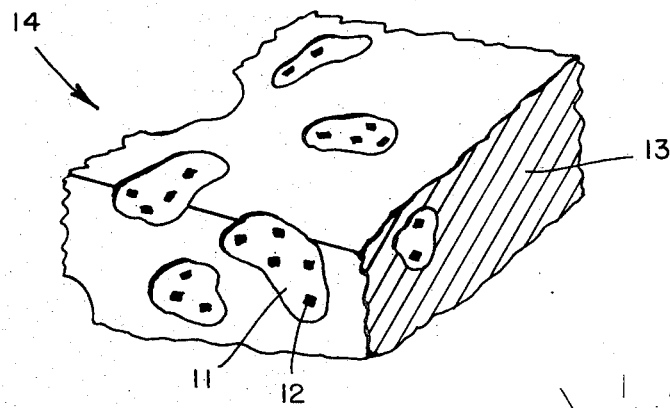
FIG. 1 is an exploded section of the material made in accordance with this invention.

Referring now to FIG. 1 there is shown a section of the porous chemiluminescent material, designated generally by numeral 14, made in accordance with this invention. Powdered polyethylene and sodium chloride were mixed together and heated until the polyethylene melted forming a mass which is cooled slightly before the sodium chloride is leached out with hot water leaving open pores 11 in the polyethylene. The porous polyethylene is now soaked in a methanol solution of lithium chloride. The methanol is removed by evaporation leaving fine lithium chloride crystals 12 dispersed throughout pores 11. The porous polyethylene containing lithium chloride is now saturated in an inert atmosphere with tetrakis(dimethylamino)ethylene forming the porous chemiluminescent material 31 which upon exposure to air luminesces or glows more intensely and for longer periods of time than the nonporous chemiluminescent materials.

Figure 2:
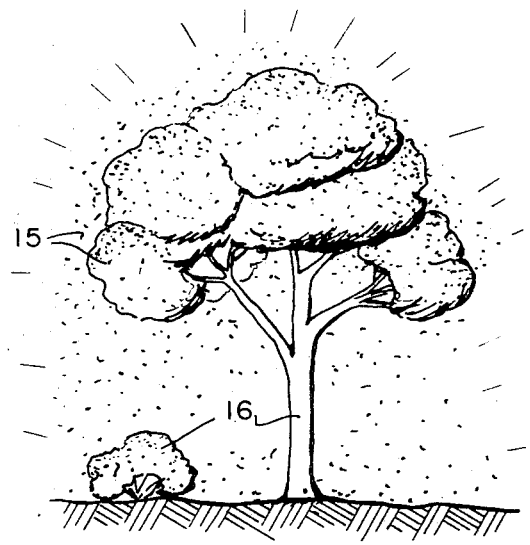
FIG. 2 is a schematic illustration of the nature of the result of the dispersal of the nonporous powdered material having a similar formulation known to the art.
Figure 3:
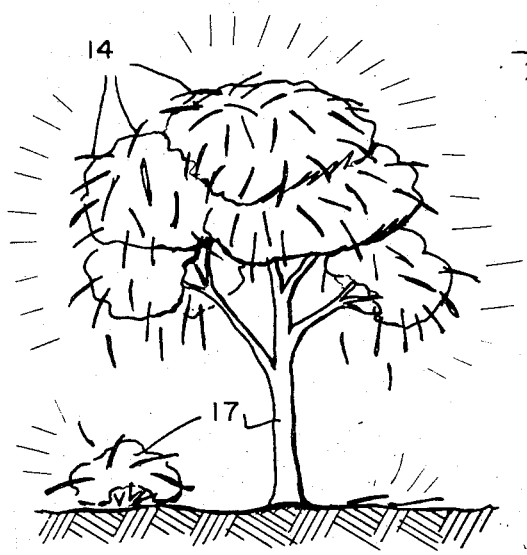
FIG. 3 is a schematic illustration of the nature of the result of the dispersal of the porous material made in accordance with this invention.

In FIG. 2 there is shown how a nonporous powdered chemiluminescent material 15 when dropped from a free-fall device in the field filters through the branches of a tree 16 creating little light output. FIG. 3 illustrates how strips of the porous material 14 of this invention hang onto the branches of a tree 17, or other shrubbery, thereby giving off an intense glow for a sustained duration of time.

The preferred formulation for the preparation of the present porous chemiluminescent material comprises a weight ratio for polyethylene, lithium chloride and tetrakis(dimethylamino)ethylene of 1:0.4:1:5.

The following examples are given to illustrate the invention in greater detail.

Example I 800 grams of powdered sodium chloride and 200 grams of powdered polyethylene were mixed together and heated until all the polyethylene melted. The melt was cooled quickly so that the sodium chloride does not separate from the molten polyethylene. The sodium chloride is then leached from the cooled molten mass with hot water and the porous polyethylene is allowed to dry. A solution of lithium chloride was prepared by dissolving 300 grams of lithium chloride in a liter of methanol. The porous material cut into various sized particles or strips was next soaked in the solution of lithium chloride and the methanol was removed by evaporation leaving very fine crystals of lithium chloride dispersed throughout the pores of the polyethylene material. Water may also be used as a solvent for lithium chloride but requires a higher temperature in the solvent evaporation step. Strips of the sponge-like material were then packed into a dispensing type container. Tetrakis(dimethylamino)ethylene was poured into the container in sufficient amount to saturate the particles and the container was sealed. Several dispensers were made and tests of the material performed to determine the light intensity and duration, also the dispersion pattern.

Figure 4:
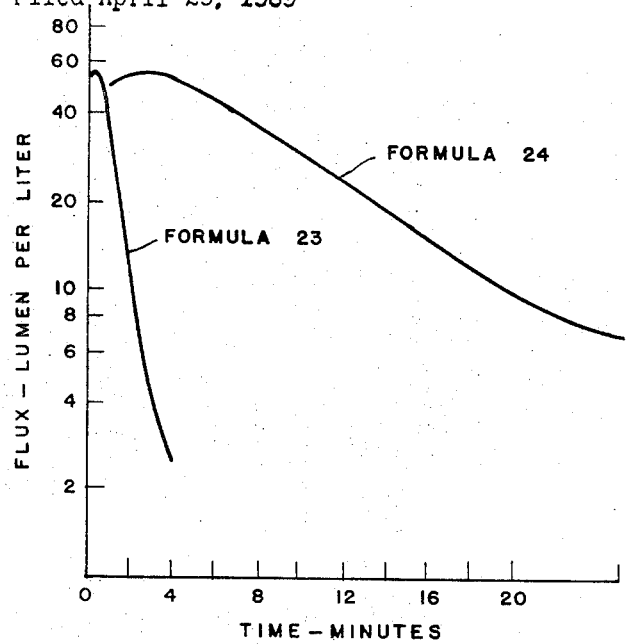
FIG. 4 is a graph showing a comparison of the performance of the material of this invention with a nonporous structure containing the same ingredients.

The dispersion pattern was effected over a large area and the light emission intensity was beyond all expectation. FIG. 4 compares a barely wet chemiluminescent powder (non-porous material) containing polyethylene, lithium chloride, and tetrakis(dimethylamino)ethylene (designated Formula 23) with the present porous material (designated Formula 24). Formula 24 shows superior light enhancement which is workable in the field where it is necessary to determine the location of military forces or to rescue personnel.

Example II

Porous polyethylene was made by extruding, in an auger type polymer extruder, a mixture of 800 grams of sodium chloride and 200 grams of powdered polyethylene. The material, extruded in the form of rods at 360° F., was cooled rapidly with water. Sodium chloride was then leached out with hot water and the porous polyethylene rods were allowed to dry. A solution of lithium chloride in methanol was prepared as described in Example I and the porous polyethylene rods were soaked therein and the methanol was removed by evaporation. The porous rods were cut into long sections and impregnated with tetrakis(dimethylamino)ethylene under inert conditions. The rods were stored in air-proof containers and used in a spin-stabilized dispenser which was dropped from the air under humid atmospheric conditions (90% R.H. at 70° F.). Light output was of superior intensity and duration. The field test results were recorded and plotted on the curve shown as FIG. 5 which compares the material of this invention (Formula 24) with a wax-based nonporous chemiluminescent formulation (Formula 14).

The lithium chloride crystals do not completely fill the pores and the tetrakis(dimethylamino)ethylene is absorbed into the polyethylene, but does not fill the pores, at least not completely.

Microscopic studies indicate that the lithium halide salt deliquesces to form water droplets in the pores of the foam material. These lithium halide saturated pools of water apparently collect the tetramethylurea oxidation product which is then complexed by the lithium halide. The pools of lithium halide salt water throughout the porous material thus act as microscopic reaction vessels for the removal of deleterious products from the chemiluminescent process.

Figure 6:
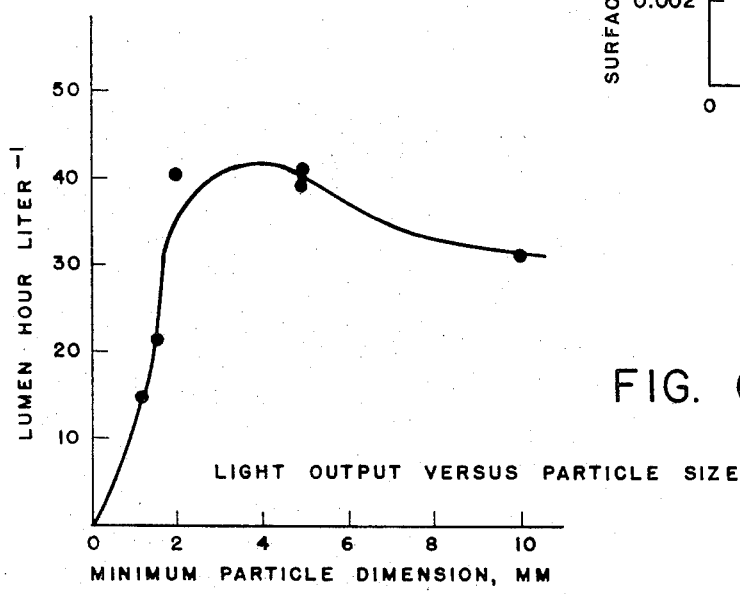
FIG. 6 is a graph illustrating the relation of particle size of the present invention to light output.

The size of the particles, pore size and total pore percentage volume affect the duration and amount of light output. These factors can be used to control the desired properties of the material. For example, larger particles show longer light duration above certain critical light intensities as is presented in Table I below and in FIG. 6 of the drawings.

Figure 5:
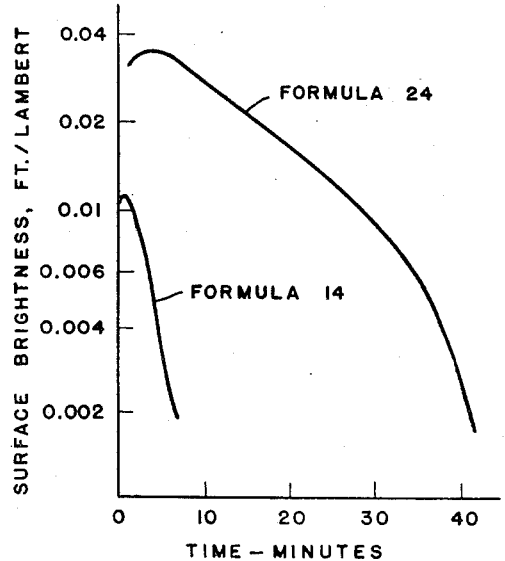
FIG. 5 is a graph showing a comparison of the performance in a field test of the present invention with a wax-based formulation containing tetrakis(dimethylamino)ethylene.

The flux and quantity of light does decrease with porosity decrease. The inventors at first used lower porosities in order to get a stronger particle to withstand explosive dissemination. However, it was found that 0.48 porosity material was no better than 0.71 porosity material in this respect. The results shown in FIGS. 4 and 5 present the marked improvement of the present porous material over nonporous powdered material and wax-based tetrakis(dimethylamino)ethylene. Particles 5 mm.-round of 70% porosity, 0.2–0.5 mm. pores and with weight ratios for PE:LiCl:TMAE equal to 1:0:0.4(+0.2):1.50 gave excellent field results.

By the term "large particle" it is meant greater than the pore size by at least the wall thickness of the pore. By "pores" it is meant any volume, or cell having walls of varying thickness empty of solids or liquids during oxidation.

The porosity may be prepared in any fashion convenient so long as no material reactive with the tetrakis-(disubstituted-amino)ethylene is introduced. Cracks, fissures, and similar holes can all work as pores.

The density of the product formed by this invention is important since most devices in which it would be used are volume limited. There have been three kinds of density with these materials. First is the time density of the material without any pores. For example, the polyethylene used was 0.916 21 ml.$^{-1}$ and sodium chloride was 2.165 g./ml. Both these materials are purchased as powders with bulk densities of about 0.467 g./ml.$^{-1}$ and 1.25 g./ml., respectively. The porous particles herein have apparent densities that are the weight divided by external volume as measured geometrically. These apparent densities may be as low as 0.2 g./ml.$^{-1}$. Of course, these particles have a particle bulk density that depends upon how they pack. Since the product of this invention is elastic it can be packed tight by loading into a device with external pressure. It is also possible to raise the particle bulk density by mixing particles of different sizes so as to fill any voids (and incidentally to tailer the light duration).

The weight ratio of tetrakis(dimethylamino)ethylene, lithium chloride, and polyethylene are important to the increase of light output. Lithium chloride with tetrakis (dimethylamino)ethylene overcomes the humidity problem through the hygroscopic nature of this salt. The serious quenching of light output caused by the oxidation by-product, tetramethylurea, is diminished due to its complexing with lithium chloride.

What is claimed is:

1. The method for the preparation of a porous chemiluminescent material which comprises
heating a mixture of polyethylene and sodium chloride to a temperature at which all the polyethylene melts forming a homogeneous mixture;
leaching the sodium chloride from said mixture with hot water when the mixture has slightly cooled forming porous polyethylene;
soaking said porous polyethylene in a solution consisting of lithium chloride in methanol;

TABLE I

[Particle size [a]]

| Volume, cc. | Test series | Dimensions, mm. | Concentration PE:LiCl:TMAE | "n" factor | Bulk density, g./cc. | Total Q, lm-hr-l$^{-1}$ | $F_{max.}$, lm.l$^{-1}$ | Time to $F_{max.}$, min. | $t_{1/10}$ [b] min. |
|---|---|---|---|---|---|---|---|---|---|
| 0.025 | 177 | 1 x 5 x 5 wafer | 1.0:0.61:0.87 | 2.8 | 0.35 | 14.3 | 56 | 15 | 37 |
| 0.0034 | 191 | 1.5 irregular | 1.0:0.50:1.0 | 4.0 | 0.35 | 21.1 | 76 | 12.5 | 21 |
| 0.200 | D-1 | 2 x 10 x 10 wafer | 1.0:0.55:1.0 | 2.8 | 0.40 | 40.6 | 68 | 30 | 70 |
| 0.060 | 202 | 3 long x 5 diam. cylinder | 1.0:0.57:1.0 | [c]5.8 | 0.39 | 39.6 | 36 | 36 | 93 |
| 0.100 | 192 | 5 long x 5 diam. cylinder | 1.0:0.58:1.0 | [c]4.7 | 0.35 | 40.8 | 56 | 27.5 | 63 |
| 0.125 | 171 | 5 x 5 x 5 cube | 1.0:0.61:0.87 | 6.0 | 0.35 | 39.5 | 60 | 32 | 66 |
| 1.000 | 173 | 10 x 10 x 10 cube | 1.0:0.61:0.87 | 6.0 | 0.35 | 31.4 | 65 | 27 | 50 |

[a] Laboratory performance of Formula 24 as a function of particle size at 30° C. and 85% R.H. Samples all of 0.70 porosity polyethylene.
[b] Duration to 1/10 of peak intensity.
[c] Cylindrical particles lying on curved surface.

The integrated light output, Q, showed a definite increase with particle size until maximum Q was reached with a minimum dimension of 2 to 5 mm. and a volume of approximately .1 cc.

evaporating the methanol from said solution leaving lithium chloride crystals dispersed throughout the pores of said polyethylene; and saturating the resulting materials with tetrakis(dimethylamino)ethylene.

2. A porous chemiluminescent material comprising
polyethylene provided with a plurality of open pores having walls of varying thickness;
lithium chloride crystals dispersed throughout the walls of said pores; and
tetrakis(dimethylamino)ethylene soaked into said polyethylene.

3. The chemiluminescent material in accordance with claim 2 wherein the ratio by weight of polyethylene, lithium chloride and tetrakis(dimethylamino)ethylene is about 1:0:0.4(+0.2):1.50, respectively.

References Cited

UNITED STATES PATENTS

| | | | |
|---|---|---|---|
| 3,360,473 | 12/1967 | Winberg | 252—188.3 |
| 3,377,291 | 4/1968 | Winberg | 252—188.3 |
| 3,494,871 | 2/1970 | Clapp et al. | 252—188.3 |

CARL D. QUARFORTH, Primary Examiner

P. A. NELSON, Assistant Examiner

U.S. Cl. X.R.

161—160; 264—49